(12) United States Patent
Trubiano

(10) Patent No.: US 6,712,371 B2
(45) Date of Patent: Mar. 30, 2004

(54) ALL-TERRAIN BICYCLE

(76) Inventor: Antoine Trubiano, 171 Marien Street, Montréal, Québec (CA), H1B 5V1

(*) Notice: Subject to any disclaimer, the term of this patent is extended or adjusted under 35 U.S.C. 154(b) by 173 days.

(21) Appl. No.: 09/985,513

(22) Filed: Nov. 5, 2001

(65) Prior Publication Data

US 2002/0027333 A1 Mar. 7, 2002

Related U.S. Application Data

(63) Continuation-in-part of application No. 09/785,820, filed on Feb. 16, 2001, which is a continuation of application No. 09/216,688, filed on Dec. 16, 1998, now abandoned.

(51) Int. Cl.$^7$ ................................................ B62K 3/02
(52) U.S. Cl. ........................ 280/274; 280/281.1; 301/43
(58) Field of Search .............................. 280/274, 279, 280/281.1, 288.3; 301/5.1, 43; 152/209.16, 209.13, 209.14, 209.15

(56) References Cited

U.S. PATENT DOCUMENTS

| | | | | |
|---|---|---|---|---|
| 581,973 A | * | 5/1897 | York | 280/281.1 |
| 589,205 A | * | 8/1897 | Cooper | 280/281.1 |
| 1,439,485 A | * | 12/1922 | Schlueter | |
| 1,446,427 A | * | 2/1923 | Matteson | |
| 1,491,537 A | * | 4/1924 | Killen | |
| 2,595,075 A | * | 4/1952 | Henderson | 280/281.1 |
| 3,226,132 A | * | 12/1965 | Otani | 280/281.1 |
| 4,356,985 A | * | 11/1982 | Yeager | 244/103 R |
| 4,427,209 A | * | 1/1984 | Morita | 280/281.1 |
| 4,453,730 A | * | 6/1984 | Klose | 280/274 |
| 4,588,542 A | * | 5/1986 | Pierce | 264/45.5 |
| 5,551,763 A | * | 9/1996 | Alsman | 301/64.7 |
| 6,126,323 A | * | 10/2000 | Tange | 280/279 |
| 6,267,399 B1 | * | 7/2001 | Buckmiller | 280/274 |

* cited by examiner

*Primary Examiner*—Daniel G. DePumpo
(74) *Attorney, Agent, or Firm*—Ogilvy Renault; Guy J. Houle

(57) ABSTRACT

An all-terrain bicycle is comprised of a tubular frame defined by a main frame section and a front fork and a pair of rear forks, to which is removably secured a front and a rear wheel. The wheels are formed of plastics material and define a hub, a circular outer molded solid tire, and an intermediate connecting framework. The outer molded solid tire is a one-piece tire defining, when viewed in transverse cross-section, a central projecting dome merging into opposed tapered wings which are recessed from the top of the dome. An integrally molded connecting formation is provided under the dome to secure to a rim of the connecting framework. The dome defines a circumferential central rib around the outer molded tire for the displacement of the bicycle on a hard surface with the wings spaced from the hard surface. The wings constitute a wide tire support surface, together with the central rib, for the displacement of the bicycle on soft surfaces such as sand, grass, etc.

14 Claims, 4 Drawing Sheets

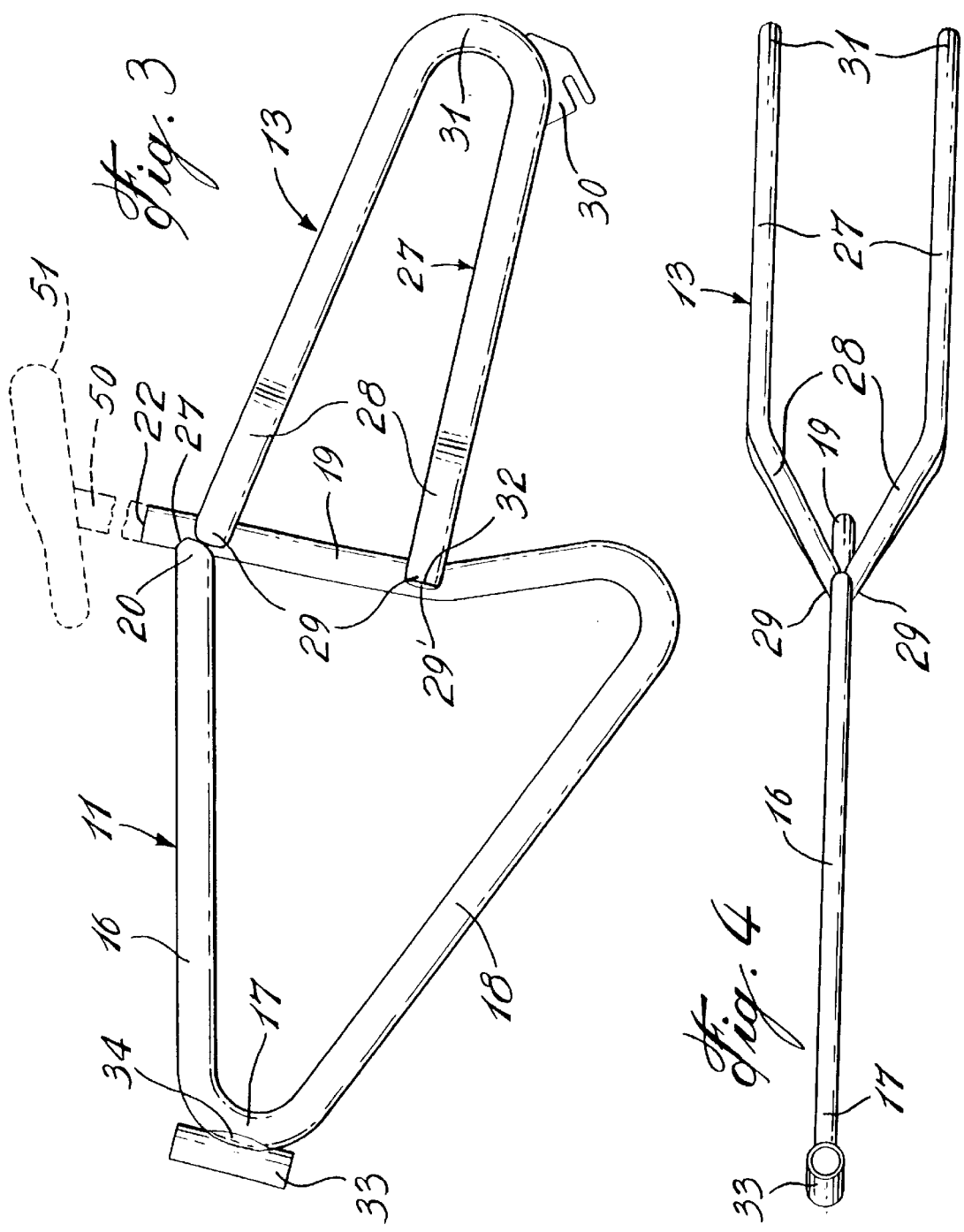

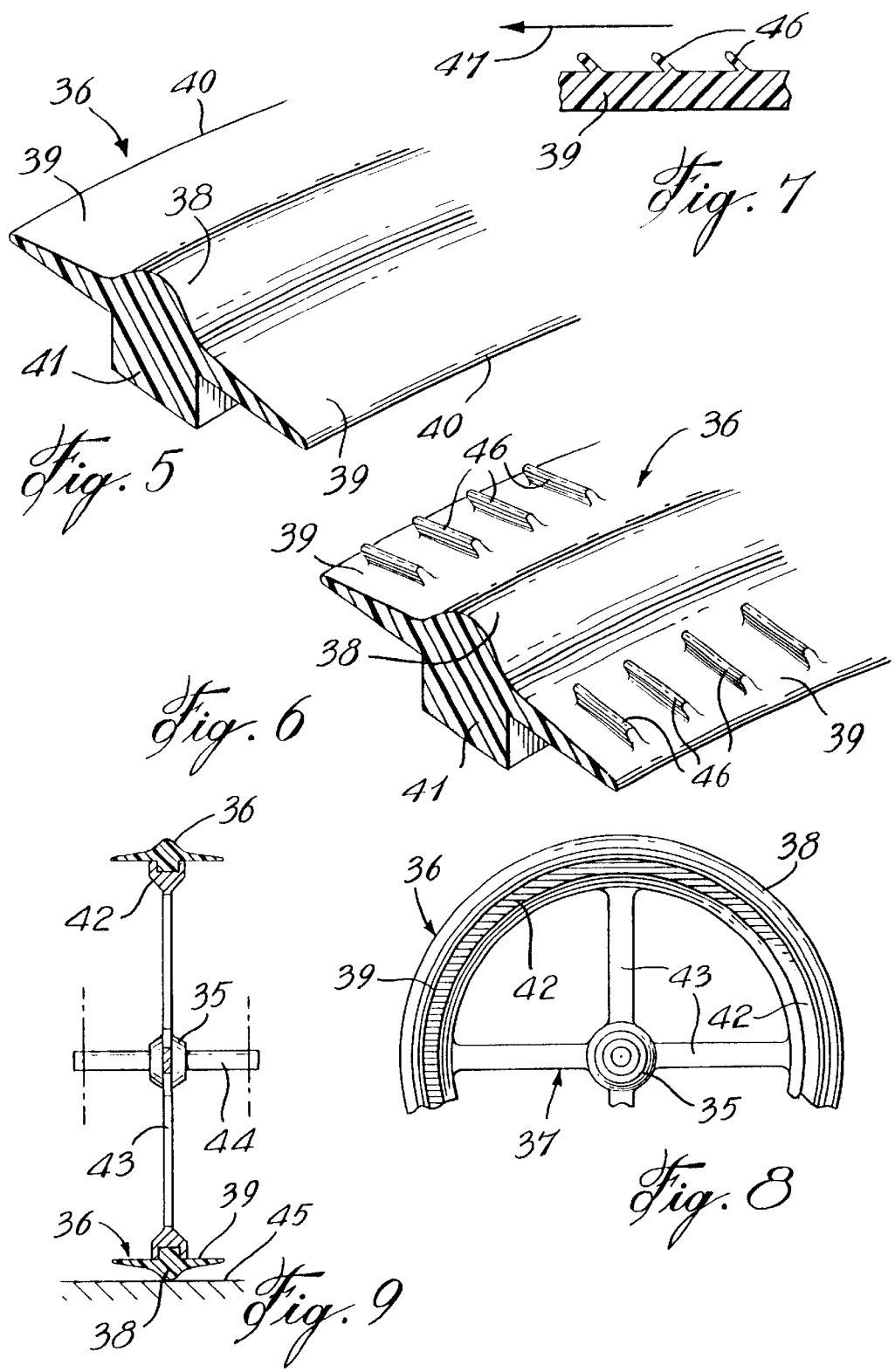

ALL-TERRAIN BICYCLE

This application is a continuation in part of application Ser. No. 09/785,820, filed Feb. 16, 2001, which is a continuation of application Ser. No. 09/216,688, filed on Dec. 16, 1998 now abandoned.

TECHNICAL FIELD

The present invention relates to an all-terrain bicycle having a four-piece frame and plastic molded wheels wherein the tires are provided with wings for the displacing the bicycle on soft surfaces such as sand, grass, etc.

BACKGROUND ART

All-terrain motorized vehicles are known and are very popular nowadays. Also, the conventional bicycle has been modified and equipped with special shock absorbers and modified tires whereby the rider can drive over irregular terrain and not be subjected to the shocks imparted by such irregular terrain. These are commonly referred to as "mountain bikes." The wheels are still of the conventional construction whereby an inflatable tire is secured about the rims. However, these tires are larger in cross-section than the conventional touring bicycle and are provided with various types of thread formations to provide better surface engagement. These "mountain bikes" are popular for driving along rough trail surfaces such as mountain trails where the bicycle encounters irregular hard packed terrain encumbered with stones, branches, mud and other like obstacles. However, such bicycles are not practical for driving into very soft ground surfaces where there is no hard support for the tires and the tires will sink into the surface and cause the rider to fall.

Another disadvantage of bicycles is their tubular metal framework, wherein the bicycle frame is constructed from thin metal tubes. These tubes are usually circular in cross-section and are machined at their outer ends whereby to fit against another tubular frame and disposed at an angle thereto for welding. These frames are connected by welds formed along the arcuate faces of the framework, and these welds may be difficult to execute. These metal tubes are usually 20 to 22 mm in thickness, whereby the bicycle may be made as light as possible. The result of this is that the welds can puncture the metal and, when these bicycles are utilized as "mountain bikes," they are subjected to abuse and often the framework will break at the welds. Furthermore, because there are many interconnecting parts in the framework, the manufacture of the bicycle is time-consuming.

SUMMARY OF INVENTION

It is a feature of the present invention to provide an all-terrain bicycle which is specifically adapted for riding on soft and irregular terrain surfaces such as sand, snow, grass or other like soft surfaces, and which can also be utilized on hard surfaces and difficult terrain.

Another feature of the present invention is to provide an all-terrain bicycle which is provided with an improved frame having fewer welds and wherein the welds are stronger than heretofore known bicycle frameworks.

Another feature of the present invention is to provide an all-terrain bicycle wherein the wheels of the bicycle are entirely molded of plastics material.

Another feature of the present invention is to provide an all-terrain bicycle which is easy to construct and which is very resistant to impact.

Another feature of the present invention is to provide an all-terrain bicycle wherein the frame of the bicycle is formed by only four shaped tubular parts welded together.

According to the above features, from a broad aspect, the present invention provides an all-terrain bicycle which is comprised of a bicycle tubular frame defined by a main frame section and a front fork and a pair of rear forks to which is removably secured a front and a rear wheel. The wheels are formed of plastics material and define a hub, a circular outer molded solid tire and an intermediate connecting framework. The outer molded solid tire is a one-piece tire defining, when viewed in transverse cross-section, a central projecting dome merging into opposed tapered wings which are recessed from the top of the dome. An integrally molded connecting formation extends under the dome and is secured to an outer rim of the connecting framework. The dome defines a circumferential central rib about the outer molded tire for the displacement of the bicycle on a hard surface, with the wings spaced from the hard surface. The wings constitute a wide tire support surface, together with the central rim, for the displacement of the bicycle on soft surfaces.

BRIEF DESCRIPTION OF DRAWINGS

A preferred embodiment of the present invention will now be described with reference to the accompanying drawings in which:

FIG. 3 is a side view of the main frame section and the rear forks of the tubular frame;

FIG. 4 is a top view of FIG. 3;

FIG. 5 is a fragmented perspective view showing the configuration of the molded solid tire;

FIG. 6 is a view similar to FIG. 5, but showing a gripping rib formed integral with the wings of the tire;

FIG. 7 is a fragmented section view showing the transverse cross-section of the ribs;

FIG. 8 is a fragmented side view showing the construction of the wheel-connecting framework; and FIG. 9 is a simplified section view showing the connecting framework secured to the molded solid tire.

DESCRIPTION OF PREFERRED EMBODIMENTS

Figure 1:
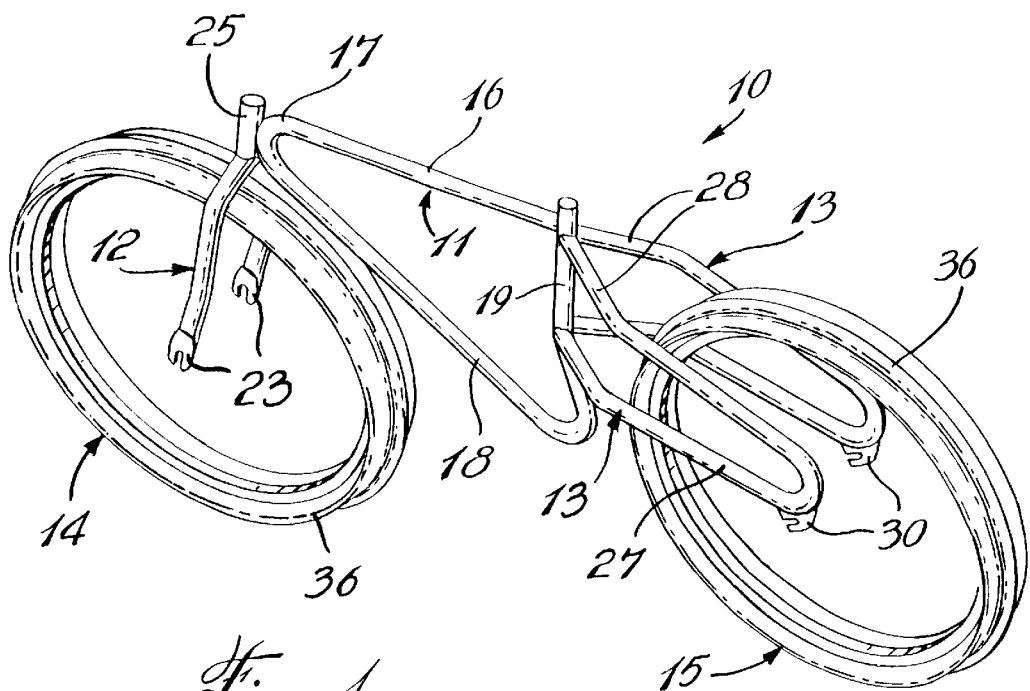
FIG. 1 is a perspective view showing the construction of the all-terrain bicycle of the present invention and herein illustrating that the tubular frame and outer tires only of the bicycle.
Figure 2:
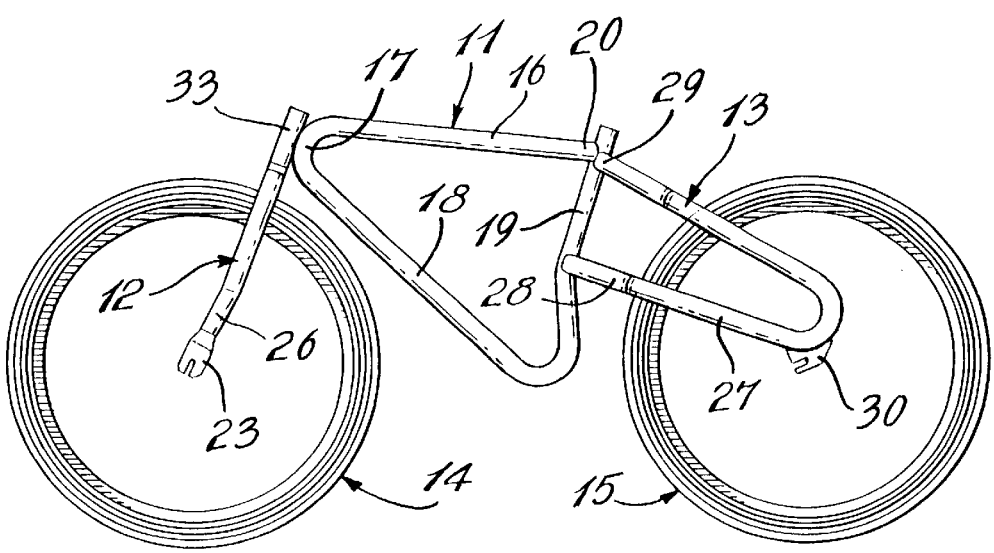
FIG. 2 is a side view of FIG. 1.

Referring to the drawings and, more particularly, to FIGS. 1 to 4, there will be described the construction of the tubular frame 10 of the all-terrain bicycle of the present invention. The tubular frame 10 is constructed from four frame sections of oval-like cross-section metal tubing and, namely, a main frame section 11, a front fork section 12 and a pair of rear fork sections 13. A front wheel 14 and a rear wheel 15 are respectively connected to the front fork 12 and the rear form 13 in a manner well known in the art and not illustrated herein.

The main frame section 11 is formed from a unitary tubular piece which is bent to form a straight top crossbar section 16, a curved head tube connecting section 17, a down tube section 18 and an upright seat support section 19. An end 20 of the top crossbar section 16 is welded at 21 near a top end 22 of the upright seat support section 19. A seat post 50, secured to a saddle 51 herein shown in phantom line, is received within the open top end of the upright seat support tube section 19 and adjusted by adjustable connecting means not shown herein but obvious to a person skilled in the art.

Figure 12:
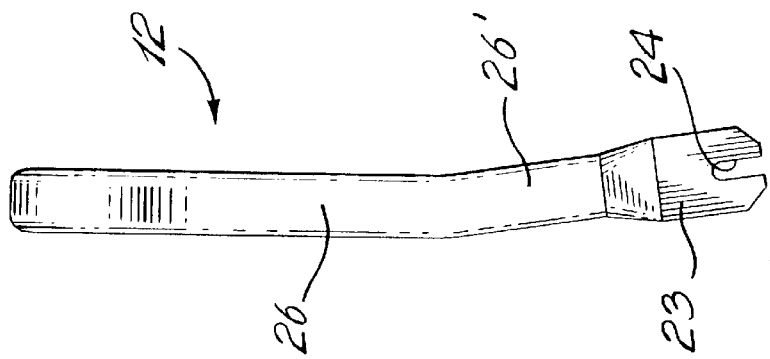
FIGS. 10 to 12 show the front fork.
Figure 11:
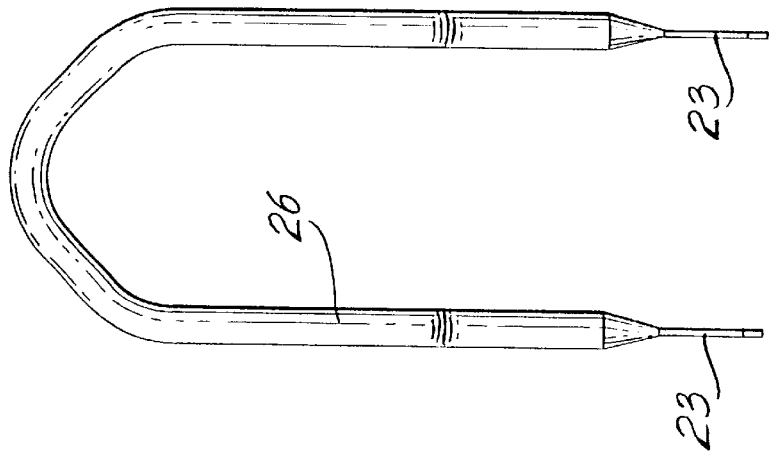
Figure 10:
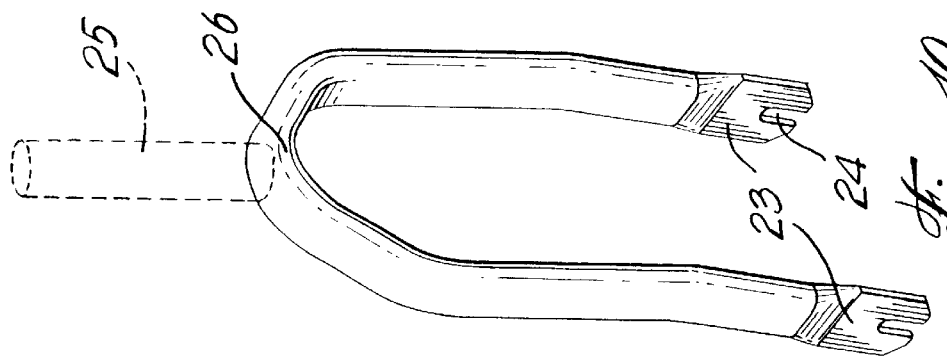

With additional reference to FIGS. 10 to 12, it can be seen that the front fork section 12 is also formed from a unitary tubular piece which is bent in the form of a U-shaped fork and compressed at opposed free end sections thereof and machined to form dropout connections 23. Axle-connecting slots 24 are cut out from the pressed free end sections of the dropout connections 23. A steering column, herein shown in phantom lines at 25, is welded or otherwise connected to the apex section 26 of the front fork section 12. As can be seen from FIGS. 11 and 12, the tubular metal piece is of substantially oval-like cross-section whereby to add rigidity to the structure. The front fork is wider than conventional bicycles whereby to receive a wheel having a wide tire, as will be described later. The lower section 26' of the front fork is also bent forwardly.

With reference again to FIGS. 1 to 4, there will be described the construction of the rear fork sections 13. There are two rear forks and each extends along opposed sides of the rear wheel 15. The rear forks are each also formed of a unitary tubular piece which is bent in the form of a U-shaped fork 27, provided with free end sections 28, which are angled to a common side, as better seen from FIG. 4, and terminate in attaching ends 29 for welding to the upright seat support section 19. A rear dropout metal connector 30 is welded to a U-section 31 of the rear fork to secure to one side of an axle (not shown but obvious to a person skilled in the art) of the rear wheel 15. As herein shown, the free ends 20 and 29 of the main frame 11 and each rear fork 13 all have a straight portion such as 29', whereby a straight weld such as 32 may be formed to interconnect the tubular frame members together. This provides for a much more rigid interconnection to form a frame capable of taking extreme abuse. It is also pointed out that there are only five welds to form the main frame with its two rear forks. The only weld on the front fork is to secure the steering column 25 to the apex section. The steering column extends through the head tube 33, which is also welded to the head tube connecting section 17 of the main frame 11 by a weld 34, which is also a substantially straight weld. It can therefore be appreciated that, because there are fewer and straighter welds, the construction time of the frame is much faster than that of convention bicycles. In fact, the entire frame can be welded by robots with the interconnecting frame parts held in a jig.

Referring now to FIGS. 5 to 9, there will be described the construction of the wheels 14 and 15. These wheels are entirely formed of plastics material and each defines a hub 35, a circular outer molded solid tire 36 and an intermediate connecting framework 37. As shown in FIGS. 5 and 6, the molded tire 36 is a one-piece tire which, when viewed in cross-section as herein illustrated, defines a central projecting dome 38 merging into opposed tapered wings 39, which taper towards their outer edges 40. An integrally molded connecting formation 41 extends under the dome for securing the tire 36 to the outer rim 42 of the connecting framework 37. This connecting formation 41 and the outer rim 42 may have a variety of shapes, whereby these parts can be interconnected in the mold when the outer rim is injected. The molded tire 36 is molded from a plastics material capable of absorbing shocks and permitting the tapered wings to flex only slightly whereby to provide support. On the other hand, the connecting framework 37 is molded from a structural rigid plastics material. The interconnecting framework 37 also has molded spokes 43, which can also have a variety shapes for esthetically pleasing appearance, and they interconnect the hub 35 to the rim and tire. An axle 44 is received within a bearing (not shown but obvious to a person skilled in the art), which is disposed in the hub 35. As can be seen from FIG. 9, when the wheels are displaced on a hard surface, such as surface 45, only the dome-shaped portion 38 of the tire engages the surface, with the wings 39 being spaced thereof, whereby these wings are not abraded by the surface material. It is also possible to mold the tire 36 from two different plastics materials, whereby the dome section may be of a harder material than the wing sections 39, but this would be more expensive to produce.

As shown in FIGS. 6 and 7, the tapered wings 39 may also be formed with integral gripping ribs 46 projecting from the outer surface thereof and disposed transversely to the circumferential central rib 38 to provide frictional engagement of the tire on a soft ground support surface, such as sand, snow, grass, etc. These ribs 46 may also be forwardly inclined, as shown in FIG. 7, to grip into the surface when rotating forwardly in the direction of arrow 47.

It is within the ambit of the present invention to cover any obvious modifications of the preferred embodiment described herein, provided such modifications fall within the scope of the appended claims.

What is claimed is:

1. An all-terrain bicycle comprising a bicycle tubular frame defined by a main frame section and a front fork and a pair of rear forks to which is removable secured a front and a rear wheel; said wheels being formed of plastics material and defining a hub, a circular outer molded solid tire and an intermediate connecting framework; said outer molded solid tire being a one-piece tire defining, when viewed in transverse cross-section, a central projecting dome merging into opposed tapered wings which are recessed from the top of said dome, and an integrally molded connecting formation under said dome secured to an outer rim of said connecting framework; said dome defining a circumferential central rib about said outer molded tire for the displacement of said bicycle on a hard surface with said wings spaced from said hard surface, said wings constituting a wide tire support surface together with said central rib for the displacement of said bicycle on soft surfaces, said main frame being formed from a unitary tubular piece which is bent to form a straight top cross-bar section, a head tube connecting section, a down-tube section and an upright seat support section, an end of said top cross-bar being welded to said upright seat support section adjacent to an open top end thereof.

2. An all-terrain bicycle as claimed in claim 1, wherein said front fork is a unitary tubular piece which is bent in the form of a U-shaped fork and pressed at opposed fill ends thereof and machined to form drop-out connections to secure an axle of said front wheel thereto, and a steering column securable to an apex section of said U-shaped fork.

3. An all-terrain bicycle as claimed in claim 2 wherein said pair of rear forks are each formed from a unitary tubular piece which is bent in the form of a U-shaped fork provided with free end sections angled to a common side and defining free attaching ends for welding to said upright seat support section, and a rear drop-out connector welded to a U-section of said rear fork to secure one side of an axle of said rear wheel thereto.

4. An all-terrain bicycle as claimed in claim 3 wherein said tubular frame is formed from hollow metal tubes having an oval cross-section.

5. An all-terrain bicycle as claimed in claim 3 wherein said main frame, said pair of rear forks and said front fork through a head tube are all interconnected by six substantially straight welds achieved by said oval cross-section tubes.

6. An all-terrain bicycle as claimed in claim 1 wherein said circular outer molded tire is molded from a plastics material capable of absorbing shocks and permitting said tapered wings to flex, said connecting framework being molded from a structural rigid plastics material.

7. An all-terrain bicycle as claimed in claim 6 wherein said connecting formation is secured to said outer rim of said connecting framework by injecting said plastics material in a mold exposing at least parts of said outer rim.

8. An all-terrain bicycle as claims in claim 1 wherein said tapered wings are provided with gripping ribs formed integral and projecting from an outer surface thereof transversely of said circumferential central rib to provide functional engagement on a soft ground support surface.

9. An all-terrain bicycle as claimed in claim 8 wherein said ribs are forwardly inclined ribs.

10. An all-terrain bicycle comprising a bicycle tubular frame defined by a main frame section and a front fork and a pair of rear forks to which is removable secured a front and a rear wheel; said main frame being formed from a unitary tubular piece which is bent to form a straight top cross-bar section, a head tube connecting section, a down-tube section and an upright seat support section; an end of said top cross-bar being welded to said upright seat support section adjacent to an open top end thereof.

11. An all-terrain bicycle as claimed in claim 10 wherein said front fork is a unitary tubular piece which is bent in the form of a U-shaped fork and pressed at opposed fill ends thereof and machined to form drop-out connections to secure an axle of said front wheel thereto, and a steering column securable to an apex section of said U-shaped fork.

12. An all-terrain bicycle as claimed in claim 11 wherein said pair of rear forks are each formed from a unitary tubular piece which is bent in the form of a U-shaped fork provided with free end sections angled to a common side and defining free attaching ends for welding to said upright seat support section, and a rear drop-out connector welded to a U-section of said rear fork to secure one side of an axle of said rear wheel thereto.

13. An all-terrain bicycle as claimed in claim 12 wherein said tubular frame is formed from hollow metal tubes having an oval cross-section.

14. An all-terrain bicycle as claimed in claim 12 wherein said main frame, said pair of rear forks and said front fork through a head tube are all interconnected by six substantially straight welds achieved by said oval cross-section tubes.

* * * * *